United States Patent
Nunnery et al.

(10) Patent No.: US 6,576,170 B1
(45) Date of Patent: Jun. 10, 2003

(54) GAS-ASSISTED INJECTION MOLDING OF THERMOSETTING POLYMERS

(75) Inventors: Len Nunnery, Kane County, IL (US); Francis Zappitelli, Walworth County, WI (US); Jody Riddle, Kane County, IL (US)

(73) Assignee: Bulk Molding Compounds, Inc., West Chicago, IL (US)

(*) Notice: Subject to any disclaimer, the term of this patent is extended or adjusted under 35 U.S.C. 154(b) by 0 days.

(21) Appl. No.: 10/127,794

(22) Filed: Apr. 23, 2002

(51) Int. Cl.⁷ .......................... B29B 17/00; B29D 22/00
(52) U.S. Cl. ................ 264/37.1; 264/37.27; 264/572
(58) Field of Search .................... 264/572, 37.1, 264/37.27

(56) References Cited

U.S. PATENT DOCUMENTS

| | | | | |
|---|---|---|---|---|
| 5,098,637 A | * | 3/1992 | Hendry | 264/572 |
| 5,262,105 A | * | 11/1993 | Komiyama et al. | 264/85 |
| 5,837,186 A | * | 11/1998 | Gotterbauer | 264/572 |

* cited by examiner

*Primary Examiner*—Suzanne E. McDowell
(74) *Attorney, Agent, or Firm*—Jack Shuman

(57) ABSTRACT

Thermosetting polymer is introduced into a mold at one end thereof to fill said mold. After a predetermined length of time to permit the thermosetting polymer to polymerize along the wall of the mold to form a wall of the desired thickness, gas is introduced into said mold at the opposite end to eject the central unpolymerized portion of the thermosetting polymer from the mold, leaving behind in the mold a hollow formed article.

9 Claims, 3 Drawing Sheets

_US 6,576,170 B1_

GAS-ASSISTED INJECTION MOLDING OF THERMOSETTING POLYMERS

BACKGROUND OF THE INVENTION

1. Field of the Invention

This invention relates, broadly speaking, to injection molding of thermosetting polymers.

More particularly, this invention relates to gas assisted injection molding of thermosetting polymers.

Even more specifically, this invention relates to gas assisted injection molding of polyester thermosetting polymers.

2. Description of the Prior Art

Gas assisted injection molding (commonly referred to as "GAIM") has been labelled one of the most significant manufacturing advancements of the past forty years. Through the manipulation of injected polymer and pressurized gas, innovators have improved plastic part quality while, in many cases, reducing processing and material costs.

GAIM was developed, in part, to reduce the volume of thermoplastic polymers required to manufacture components with thick cross sections. Aside from the economies derived from reduced material requirements, GAIM aids in the elimination of molded in-stress (cracks, warpage), sink marks and unpredictable physical properties (internal stratification). Reduced cycle times are also a benefit, allowing cavity requirements (thus tooling investment) to be reduced by 50% or more.

GAIM has been practiced almost exclusively by the manufacturers of thermoplastic components. The cost advantages associated with GAIM have provided opportunities for more expensive thermoplastic materials to replace low cost thermosetting materials. Even high heat applications, traditionally dominated by thermosetting polymers, are beginning to be penetrated by gas-assisted thermoplastic polymers. The savings realized by reduced tooling, cycle times and material consumption are driving this transition. Molders using thermoplastic polymers several times as expensive as equivalent thermosetting polymers can make parts that cost less using GAIM techniques.

For over a decade, manufacturers of parts made of thermosetting polymers have been faced with the market challenges associated with GAIM. Although there have been some notable gains using phenolic materials, no thermoset technology has shown the quality, repeatability and economies demonstrated by thermoplastics. Up until recently, the thermoset processor's option was to relinquish margin or lose market share.

The inventors have completed a series of trials that have yielded high quality thermoset parts using gas-assisted injection molding techniques.

SUMMARY OF THE INVENTION

One of the objects of this invention is to provide an improved method and apparatus for injection molding of thermosetting polymers.

Another of the objects of this invention is to provide an improved method and apparatus for gas-assisted injection molding of thermosetting material.

A particular object of this invention is to provide an improved method and apparatus for gas-assisted injection molding of polyester thermosetting material.

Still other and further objects of this invention will become apparent by reference to the accompanying specification and drawings, and to the appended claims.

The foregoing objects are attained in part by providing a mold with a gas injection pin at a location remote from that point in the mold where the thermosetting polymer is introduced, i.e., at the end of flow of the thermosetting polymer in the mold.

DESCRIPTION OF THE DRAWINGS

Referring now to the drawings, in which like numerals represent like parts in the several views.

DESCRIPTION OF THE PREFERRED EMBODIMENT

Figure 1:
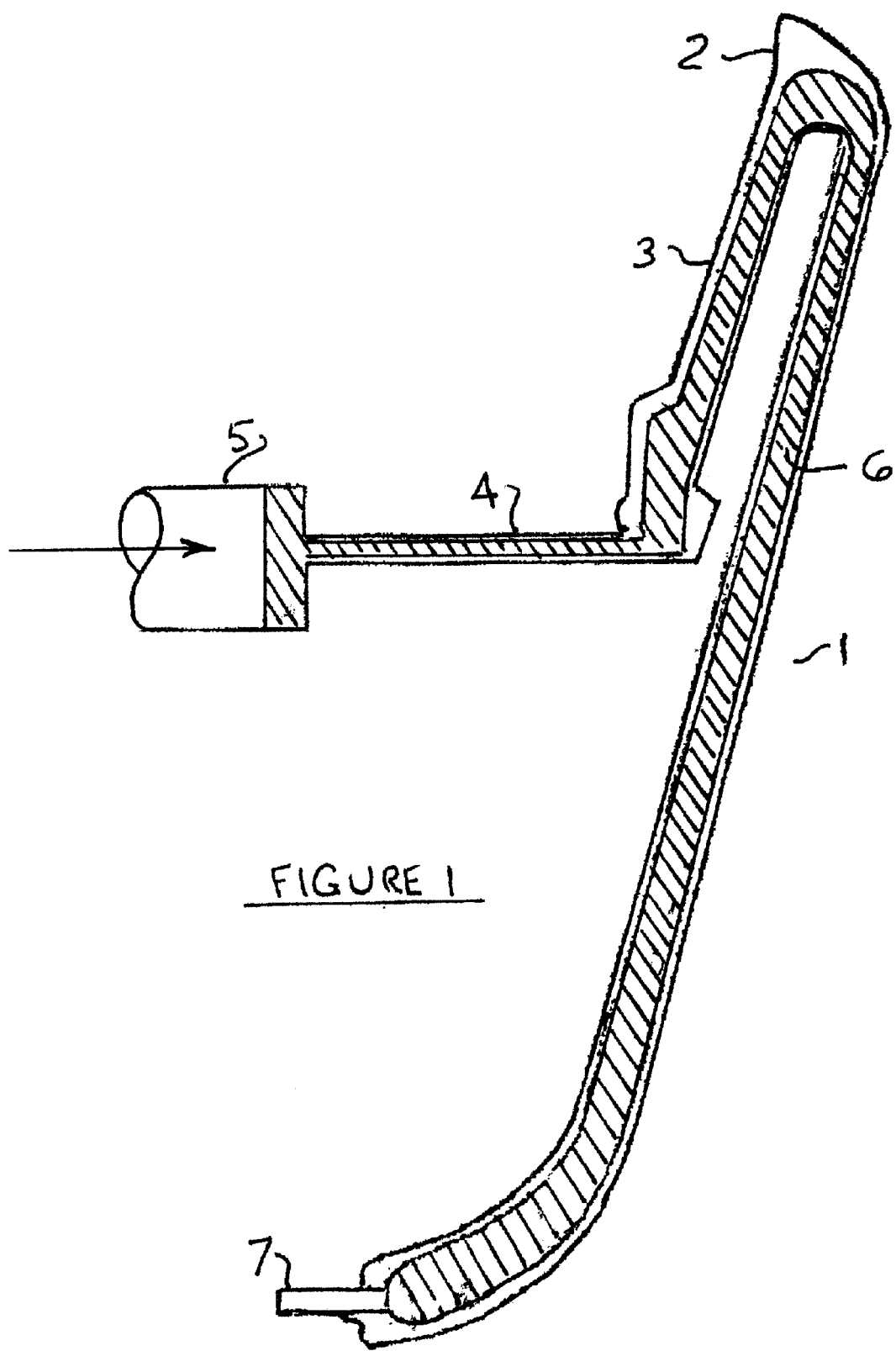
FIG. 1 represents, diagrammatically, a cross-section of a mold after the thermosetting polymer has been introduced in such quantity as to fill the mold.
Figure 2:
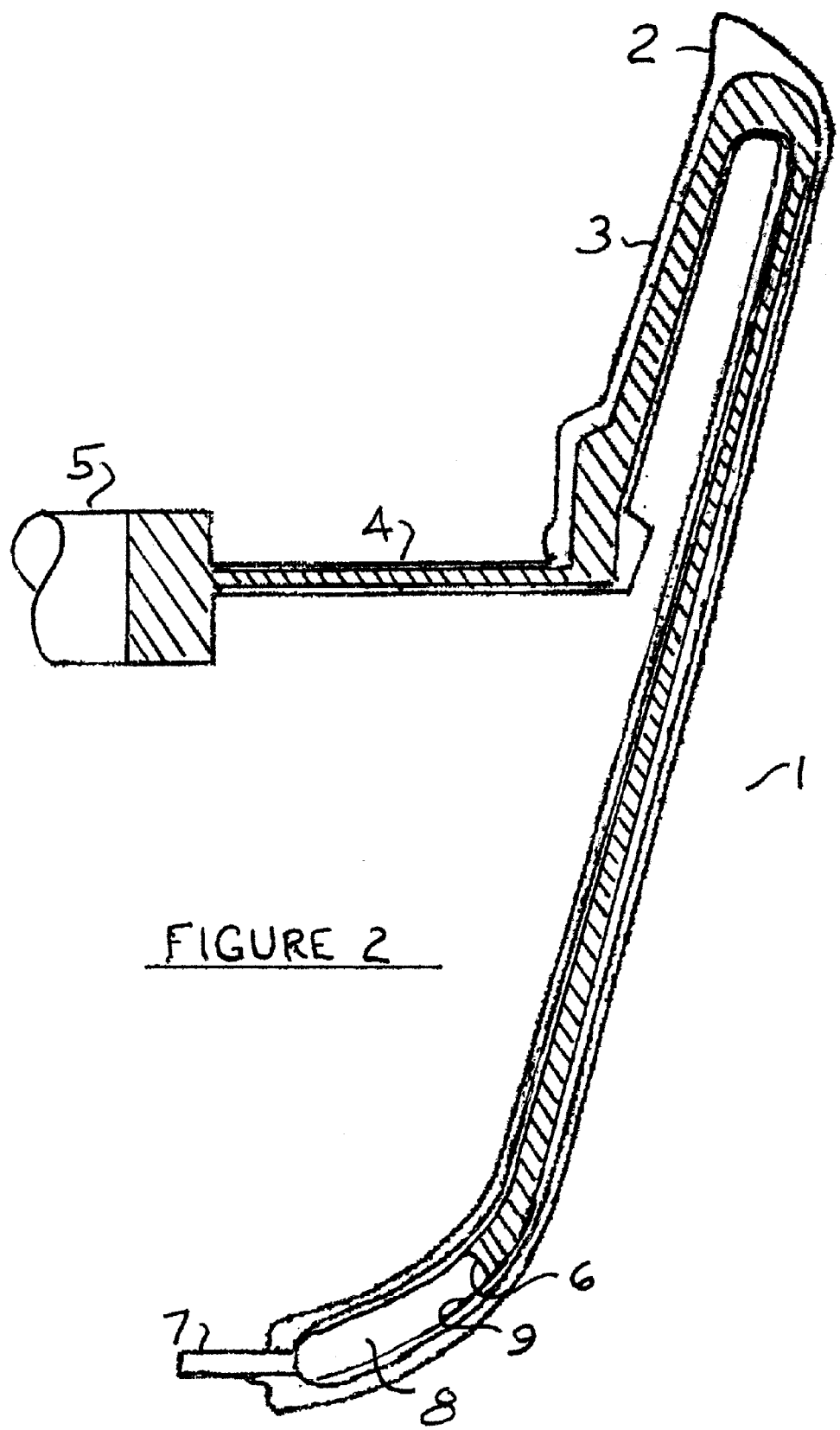
FIG. 2 represents, diagrammatically, a cross-section of the mold of FIG. 1 shortly after commencement of the injection of gas through the gas injection pin at a point remote from the point of entry of the thermosetting polymer into the mold.
Figure 3:
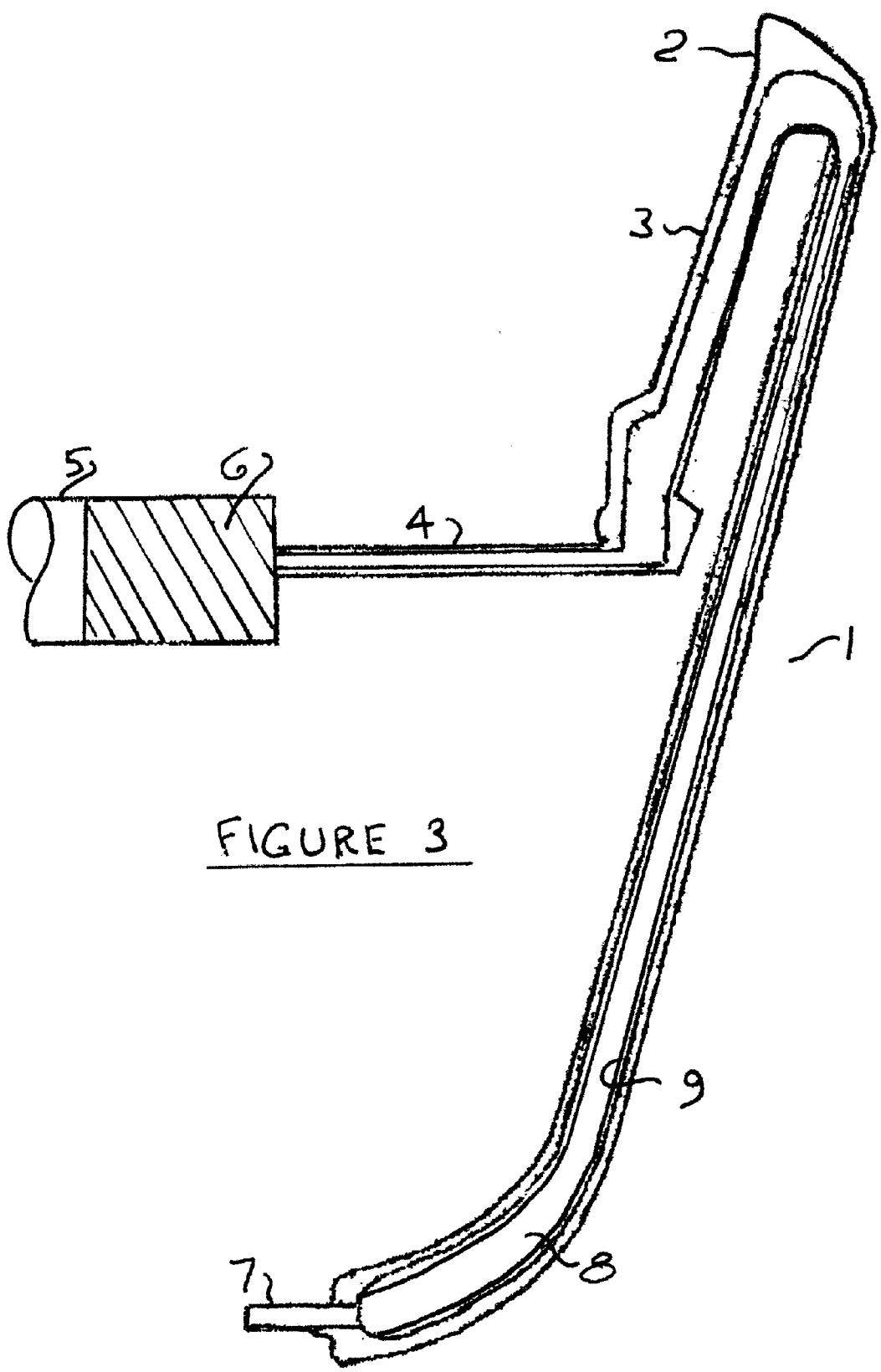
FIG. 3 represents, diagrammatically, a cross-section of the mold of FIG. 1 near the end of a molding cycle.

Mold 1, shown diagrammatically and in cross-section in FIGS. 1, 2 and 3, is provided with gate 2 at one end thereof. Runner 3 communicates between gate 2 and sprue 4 which, in turn, communicates with the nozzle 5 of a conventional injection molding machine (not shown). The thermosetting polymer 6 to be formed in mold 1 may be a polyester-based composite having a molding temperature ranging between approximately 250° F. and approximately 400° F.

The thermosetting polymer 6 (the aforementioned polyester-based composite, although the present invention may also profitably be employed in the molding of other thermosetting polymers) is, at the start of a molding cycle, introduced by the conventional injection molding machine into mold 1 at one end thereof as shown in FIG. 1.

Gas injection pin 7 is mounted to mold 1 at a point remote from gate 2, i.e., at that end of mold 1 opposite gate 2 which is at the end of flow of the thermosetting polymer 6, and communicates with the interior of mold 1. Gas 8 injected by gas injection pin 7 into mold 1 preferably is nitrogen at a pressure ranging between approximately 100 psi and approximately 10,000 psi. Other gases in lieu of nitrogen may be used, provided they do not have a deleterious effect on the thermosetting polymer 6 being molded.

The operation of the present invention will now be described.

At the beginning of a molding cycle, as shown in FIG. 1, with nozzle 5 of the injection molding machine connected to sprue 4, the conventional injection molding machine introduces the thermosetting polymeric material 6 into sprue 4, thence through runner 3 and gate 2 into mold 1 to fill the said mold 1.

The screw of the conventional injection molding machine provides pressure to mold 1 and the contents thereof (the charge of thermosetting polymeric material 6) through sprue 4, runner 3 and gate 2. The thermosetting polymeric material 6 in mold 1 starts to polymerize ("set") from its outermost surface inwardly (i.e., in a direction inwardly from the wall of mold 1). After a predetermined period of time, the hardened walls 9 of the part being formed in mold 1 reach a thickness that is considered adequate for end use considerations. At this point, nitrogen 8 is injected into mold 1 through gas injection pin 7 to force out of mold 1 and through gate 2, runner 3 and sprue 4, and thence into nozzle 5 of the conventional injection molding machine that central portion of the thermosetting polymeric material 6 that has not yet polymerized (i.e., not yet "set"). All this time, nozzle 5 of the injection molding machine has exerted pressure, through sprue 4, runner 3 and gate 2, on the contents of mold 1. Now, the nozzle 5 of the injection molding machine is backed off from the sprue bushing on sprue 4, thereby allowing the pressurized nitrogen 8 to escape harmlessly. Mold 1 can now be opened and the hollow formed thermoset part removed therefrom.

It will, of course, be evident that the cross-sectional areas of gate 2, runner 3 and sprue 4 must be large enough to permit unpolymerized thermosetting polymer 6 to pass therethrough.

We have found that the length of time between the completion of the first step in the molding cycle, as shown diagrammatically in FIG. 1, in which mold 1 has been completely filled with thermosetting polymeric material 6, and the next step in the molding cycle, as shown diagrammatically in FIG. 2, in which is commenced the injection of nitrogen 8, may be critical in the production of a satisfactory hollow molded article. In particular, there is a direct correlation between this length of time and the thickness of the wall of the hollow article being formed. The greater this length of time, the thicker will be the wall of the article. In other words, the desired wall thickness of the article will determine this length of time.

For example, in the employment of a mold to produce a 30"×1.25"×0.75" range handle from a polyester-based thermosetting composite 6, a delay of 15 seconds between the filling of mold 1 with the thermosetting polymer 6 (as shown in FIG. 1) and the beginning of the injection of nitrogen 8 (as shown in FIG. 2) resulted in a hollow formed article having a wall thickness of approximately 0.095". Such an article would be unacceptable for the contemplated end use. When the delay was increased to 45 seconds, the hollow finished article would have a wall thickness of approximately 0.165", a satisfactory result.

The determination of the proper length of time between the filling of mold 1 with thermosetting polymer 6 and the beginning of the injection of nitrogen 8 into the mold 1, considering among other things the use to which the formed article is to be put, is of course empirical.

In quick repetitive molding cycles, thermosetting polymeric material 6 ejected from mold 1 by nitrogen 8 and accumulating in nozzle 5 of the injection molding machine will be warm (perhaps 120° F.) and unpolymerized. This unpolymerized thermosetting polymeric material 6 is incorporated with the next charge of virgin thermosetting polymeric material 6 from the nozzle 5 of the injection molding machine to be fed to mold 1. By so reclaiming the ejected thermosetting polymeric material 6 for the next charge of mold 1, very substantial savings in material costs and cycle times are realized.

Since modifications and changes which do not depart from the spirit of the invention as disclosed herein may readily occur to those skilled in the art to which this invention pertains, the appended claims should be construed as covering all suitable modifications and equivalents.

We claim:

1. A method of forming a hollow article of thermosetting polymer, said method comprising:
    (a) introducing thermosetting polymer into a mold to fill said mold,
    (b) subsequent to step (a), waiting a predetermined length of time sufficient to permit the thermosetting polymer to polymerize along the wall of the mold sufficiently to form a wall of said article of desired thickness,
    (c) subsequent to step (b), injecting a gas under pressure into said mold at a point at the end of flow of said thermosetting polymer in said mold to eject from said mold through the point at which the thermosetting polymer had been introduced into said mold the central portion of said thermosetting polymer that has not yet polymerized, thereby leaving in the mold a hollow molded article,
    (d) relieving pressure from the interior of said mold,
    (e) opening said mold and removing therefrom the hollow molded article.

2. Method as in claim 1, wherein:
    (f) said thermosetting polymer is polyester-based.

3. Method as in claim 1, wherein:
    (f) said thermosetting polymer has a molding temperature ranging between approximately 250° F. and approximately 400° F.

4. Method as in claim 1, wherein:
    (f) said gas is injected into said mold at a pressure ranging between approximately 100 psi and approximately 10,000 psi.

5. A method of forming in a series of repetitive steps hollow articles of thermosetting polymer, said method comprising:
    (a) introducing thermosetting polymer into a mold to fill said mold,
    (b) subsequent to step (a), waiting a predetermined length of time sufficient to permit said thermosetting polymer to polymerize along the wall of the mold sufficiently to form a wall of said article of desired thickness,
    (c) subsequent to step (b), injecting a gas under pressure into said mold at a point at the end of flow of said thermosetting polymer in said mold to eject from said mold through the point at which the thermosetting polymer had been introduced into said mold the central portion of said thermosetting polymer that has not yet polymerized, thereby leaving in the mold a hollow molded article,
    (d) relieving pressure from the interior of said mold,
    (e) opening said mold and removing therefrom the hollow molded article,
    (f) combining the ejected thermosetting polymer from step (c) with virgin thermosetting polymer and introducing said combined thermosetting polymer into said mold to fill said mold,
    (g) repeating step (b),
    (h) repeating step (c),
    (i) repeating step (d),
    (j) repeating step (e).

6. Method as in claim 5, wherein:
    (k) said thermosetting polymer is polyester-based.

7. Method as in claim 5, wherein:
    (k) said thermosetting polymer has a molding temperature ranging between approximately 250° F. and approximately 400° F.

8. Method as in claim 5, wherein:
    (k) said gas is injected into said mold at a pressure ranging between approximately 100 psi and approximately 10,000 psi.

9. Method as in claim 5, wherein:
    (k) step (a) is performed by employing an apparatus to introduce thermosetting polymer into said mold,
    (l) said unpolymerized thermosetting polymer is ejected in step (c) into said apparatus,
    (m) said ejected unpolymerized thermosetting polymer is combined in step (f) with said virgin thermosetting polymer in said apparatus.

* * * * *

(12) EX PARTE REEXAMINATION CERTIFICATE (5511th)
United States Patent
Nunnery et al.

(10) Number: US 6,576,170 C1
(45) Certificate Issued: Sep. 12, 2006

(54) GAS-ASSISTED INJECTION MOLDING OF THERMOSETTING POLYMERS

(75) Inventors: Len Nunnery, Kane County, IL (US); Francis Zappitelli, Walworth County, WI (US); Jody Riddle, Kane County, IL (US)

(73) Assignee: Bulk Molding Compounds, Inc., West Chicago, IL (US)

Reexamination Request:
No. 90/007,182, Aug. 25, 2004

Reexamination Certificate for:
Patent No.: 6,576,170
Issued: Jun. 10, 2003
Appl. No.: 10/127,794
Filed: Apr. 23, 2002

(51) Int. Cl.
*B29B 17/00* (2006.01)
*B29D 22/00* (2006.01)

(52) U.S. Cl. .............. 264/37.1; 264/37.27; 264/572
(58) Field of Classification Search .............. 264/37.27, 264/572, 37.1
See application file for complete search history.

(56) References Cited

U.S. PATENT DOCUMENTS

| 4,247,515 | A | | 1/1981 | Olabisi ................. 264/500 |
| 4,447,386 | A | * | 5/1984 | Dannels et al. .......... 264/328.2 |
| 5,423,667 | A | | 6/1995 | Jaroschek ............... 425/130 |
| 5,618,858 | A | * | 4/1997 | Hauschildt et al. ......... 523/200 |
| 6,146,579 | A | * | 11/2000 | Matsumoto et al. ........ 264/513 |
| 6,655,711 | B1 | | 12/2003 | Labrie et al. ............ 280/728.3 |
| 6,767,487 | B1 | * | 7/2004 | Pearson ................. 264/40.4 |

OTHER PUBLICATIONS

Van Nostrand's Scientific Encyclopedia, 3rd Ed., 1958, pp. 1268–1273 ("Plastics").

* cited by examiner

*Primary Examiner*—Michael P. Colaianni

(57) ABSTRACT

Thermosetting polymer is introduced into a mold at one end thereof to fill said mold. After a predetermined length of time to permit the thermosetting polymer to polymerize along the wall of the mold to form a wall of the desired thickness, gas is introduced into said mold at the opposite end to eject the central unpolymerized portion of the thermosetting polymer from the mold, leaving behind in the mold a hollow formed article.

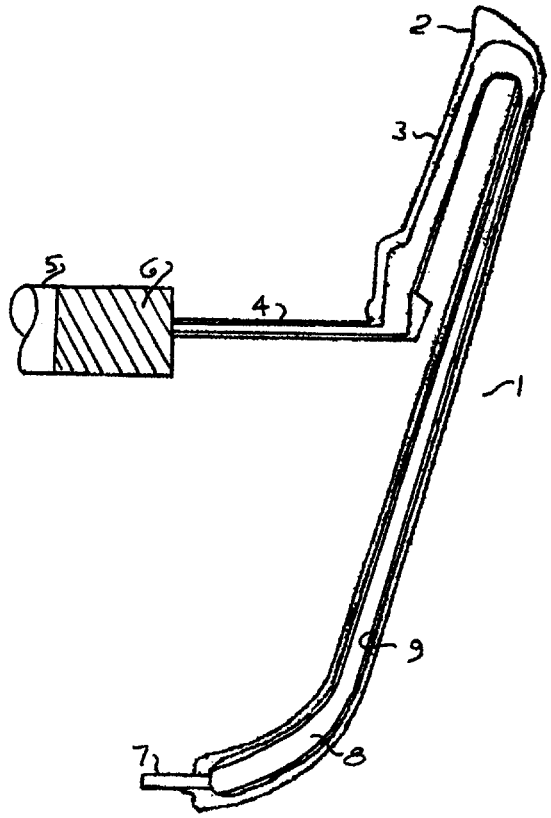

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 55 through column 3, line 8:

The screw of the conventional injection molding machine provides pressure to mold 1 and the contents thereof (the charge of thermosetting polymeric material 6) through sprue 4, runner 3 and gate 2. The thermosetting polymeric material 6 in mold 1 starts to polymerize ("set") from its outermost surface inwardly (i.e., in a direction inwardly from the wall of mold 1). After a predetermined period of time, the hardened walls 9 of the part being formed in mold 1 reach a thickness that is considered adequate for end use considerations. At this point, nitrogen 8 is injected into mold 1 through gas injection pin 7 to force out of mold 1 and through gate 2, runner 3 and sprue 4, and thence into nozzle 5 of the conventional injection molding machine that central portion of the thermosetting polymeric material 6 that has not yet polymerized (i.e., not yet "set"). *The unpolymerized central portion 6 of the thermosetting material is ejected by the nitrogen gas through a conduit (gate 2, runner 3, sprue 4) such that after the ejection the conduit is free of any obstruction formed from said thermosetting polymer other than any flow obstructing film formed by said thermosetting polymer on the wall of the conduit.* All this time, nozzle 5 of the injection molding machine has exerted pressure, through sprue 4, runner 3 and gate 2, on the contents of mold 1. Now, the nozzle 5 of the injection molding machine is backed off from the sprue bushing on sprue 4, thereby allowing the pressurized nitrogen 8 to escape harmlessly. Mold 1 can now be opened and the hollow formed thermoset part removed therefrom.

AS A RESULT OF REEXAMINATION, IT HAS BEEN DETERMINED THAT:

Claim 9 is cancelled.

Claims 1 and 5 are determined to be patentable as amended.

Claims 2–4 and 6–8, dependent on an amended claim, are determined to be patentable.

1. A method of forming a hollow article of thermosetting polymer, said method comprising:
   (a) introducing thermosetting polymer *from an injection molding machine through a conduit* into a mold to fill said mold,
   (b) subsequent to step (a), waiting a predetermined length of time sufficient to permit the thermosetting polymer to polymerize along the wall of the mold sufficiently to form a wall of said article of desired thickness,
   (c) subsequent to step (b), injecting a gas under pressure into said mold at a point at the end of flow of said thermosetting polymer in said mold to eject from said mold through the point at which the thermosetting polymer had been introduced into said mold, *said ejection being into said conduit and thence into said injection molding machine, said conduit after said ejection being free of any obstruction formed from said thermosetting polymer other than any flow obstructing film formed by said thermosetting polymer on the wall of said conduit as the said thermosetting polymer passes from said mold into said injection molding machine,* the central portion of said thermosetting polymer that has not yet polymerized *in said mold*, thereby leaving in the mold a hollow molded article,
   (d) relieving pressure from the interior of said mold,
   (e) opening said mold and removing therefrom the hollow molded article.

5. A method of forming in a series of repetitive steps hollow articles of thermosetting polymer, said method comprising:
   (a) introducing thermosetting polymer *from an injection molding machine through a conduit* into a mold to fill said mold,
   (b) subsequent to step (a), waiting a predetermined length of time sufficient to permit said thermosetting polymer to polymerize along the wall of the mold sufficiently to form a wall of said article of desired thickness,
   (c) subsequent to step (b), injecting a gas under pressure into said mold at a point at the end of flow of said thermosetting polymer in said mold to eject from said mold through the point at which the thermosetting polymer had been introduced into said mold, *said ejection being into said conduit and thence into said injection molding machine, said conduit after said ejection being free of any obstruction formed from said thermosetting polymer other than any flow obstructing film formed by said thermosetting polymer on the wall of said conduit as the said thermosetting polymer passes from said mold into said injection molding machine,* the central portion of said thermosetting polymer that has not yet polymerized *in said mold*, thereby leaving in the mold a hollow molded article,
   (d) relieving pressure from the interior of said mold,
   (e) opening said mold and removing therefrom the hollow molded article,
   (f) combining the ejected thermosetting polymer from step (c) with virgin thermosetting polymer *in said injection molding machine* and introducing said combined thermosetting polymer into said mold to fill said mold,
   (g) repeating step (b),
   (h) repeating step (c),
   (i) repeating step (d),
   (j) repeating step (e).

[9. Method as in claim 5, wherein:
   (k) step (a) is performed by employing an apparatus to introduce thermosetting polymer into said mold,
   (l) said unpolymerized thermosetting polymer is ejected in step (c) into said apparatus,
   (m) said ejected unpolymerized thermosetting polymer is combined in step (f) with said virgin thermosetting polymer in said apparatus.]

* * * * *